United States Patent

Yoshiyuki et al.

[11] 4,065,234
[45] Dec. 27, 1977

[54] MAGNETICALLY DRIVEN ROTARY PUMPS

[75] Inventors: Honma Yoshiyuki; Yamazaki Fumio, both of Tokyo, Japan

[73] Assignee: Nihon Kagaku Kizai Kabushiki Kaisha, Tokyo, Japan

[21] Appl. No.: 643,204

[22] Filed: Dec. 22, 1975

[51] Int. Cl.$^2$ ............................................. F04B 17/00
[52] U.S. Cl. ............................ 417/420; 64/28 M; 192/84 PM; 417/365
[58] Field of Search .......... 417/420, 365, 410, 423 R; 310/104; 64/28 M; 192/84 PM

[56] References Cited

U.S. PATENT DOCUMENTS

| | | | |
|---|---|---|---|
| 1,829,686 | 10/1931 | Swendsen | 417/420 |
| 1,829,686 | 10/1931 | Swendsen | 417/420 |
| 2,046,965 | 7/1936 | Panoff | 417/420 |
| 3,001,479 | 9/1961 | Swenson et al. | 417/420 |
| 3,221,389 | 12/1965 | Cowell | 64/28 M |
| 3,429,137 | 2/1969 | Law | 417/420 |
| 3,680,984 | 8/1972 | Young et al. | 417/420 |
| 3,932,068 | 1/1976 | Zimmermann | 417/420 |
| 3,938,914 | 2/1976 | Zimmermann | 417/420 |
| 3,947,153 | 3/1976 | Matthias et al. | 417/365 |

FOREIGN PATENT DOCUMENTS

| | | | |
|---|---|---|---|
| 525,316 | 5/1956 | Canada | 192/84 PM |
| 1,285,244 | 1/1962 | France | 417/420 |
| 1,165,144 | 3/1964 | Germany | 417/420 |
| 928,135 | 9/1955 | Germany | 192/84 PM |

Primary Examiner—William L. Freeh
Assistant Examiner—Edward Look
Attorney, Agent, or Firm—Frank J. Jordan

[57] ABSTRACT

A magnetically driven, powerful rotary pump comprising at least one driven magnet secured to the rotary shaft of a pump and housed in a magnet case to separate the driven magnet in a liquid-type chamber from the pump chamber and at least two driving magnets secured to a drive shaft to be connected to a power source, with the at least one driven magnet being housed in the magnet case and being sandwiched in between the driving magnets. In one embodiment, the at least one driven magnet treated to be corrosion resistant and the magnet case is made of a corrosion resistant material or treated to be corrosion resistant, thereby rendering it unnecessary to form a liquid-tight seal between the pump chamber and the inside of the magnet case.

7 Claims, 4 Drawing Figures

MAGNETICALLY DRIVEN ROTARY PUMPS

This invention relates to a magnetically driven pump and more particularly to a magnetically driven, powerful rotary pump in which the driving mechanism and the driven mechanism are separated from, and independent of, each other and no thrust is caused in the axial direction of the pump due to the cancellation of magnetic attraction produced in the axial direction between the driving and driven mechanisms.

Heretofore, in conventional pumps of this type, cylindrical driving and driven magnets concentrically positioned one in another have been used in transmitting a driving torque from a power source to the impeller of the pump.

The primary object of this invention is to provide an improved magnetically driven rotary pump with an impeller having a powerful magnetic drive effective through an impermeable diaphragm.

The above and other objects will be apparent from the following description and accompanying drawings in which.

Figure 1:
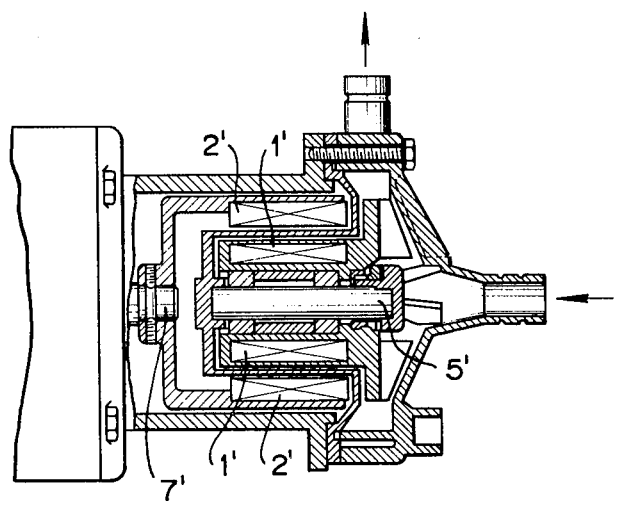
FIG. 1 is a longitudinally sectional view of a magnetically driven rotary pump of conventional type.

Referring now to FIG. 1, a conventional magnetically driven rotary pump comprises, for example, an outer cylindrical magnet 2' fitted to one end of a drive shaft 7' of a motor (not shown) for rotating the magnet 2' of the pump, an inner cylindrical magnet 1' fitted to one end of a rotary shaft 5' of the pump, the magnet 1' being positioned within the magnet 2' and an impermeable diaphragm interposed between the magnets.

In this conventional magnetically driven rotary pump, the inner and outer magnets are caused to rotate with the overhung pump shaft 5' and motor shaft 7' respectively, whereby the pump is necessarily has a large volume and a problem arises as to the processing or working of the diaphragm.

In another conventional pump of this type in which a driving magnet is directly fitted to the driving shaft of a motor, a driven magnet is directly fitted to the impeller of a pump in the pump chamber, the driving magnet magnetically causing the impeller to rotate through the diaphragm in the pump chamber, a driving torque transmitted from the driving magnet to the driven magnet becomes greater with the increase in magnetic attraction produced between these magnets but such an increased magnetic attraction is directly applied, as a thrust, to a bearing in the pump chamber, thereby raising many problems such as the shortening of life of the bearing and a great expense incurred by the requirement of high accuracy in assembly of the driving magnet and the pump body.

The pump of this invention is different from such conventional pumps as above and eliminates the aforementioned drawbacks. More particularly the pump of this invention comprises a driven mechanism in which at least one driven permanent magnet is secured to the rotary shaft of the pump and a driving mechanism in which at least two driving permanent magnets are secured to a drive shaft (to be connected to a power source) positioned in alignment with said rotary shaft, are rotatable concentrically with the rotary shaft of the pump and will cause the driven magnet to rotate by virtue of the magnetic attraction between the driven and driving magnets, the driven and driving mechanisms being separated from and independent of each other. The present invention is characterized in that the driven magnet is preferably in the form of a disc and, if desired, treated to provide corrosion resistance; the driven magnet is fitted to one end of the rotary shaft of the pump and the pump impeller to the other end thereof; the driven magnet is housed in a magnet case to be separated or sealed in a liquid-type manner from the pump chamber and the open air or, if the driven magnet is one treated to be made corrosion resistant and the magnet case is one made of an anti-corrosive material or treated to be made corrosion resistant, then the thus-treated driven magnet may be housed in the corrosion resistant magnet case without necessity to form a liquid-tight seal between the pump chamber and the inside of the magnet case. The driving magnets are in the form of preferably a disc having a hole in the center or are preferably annular in shape; the driving magnets are positioned such that the driven magnet is sandwiched in, through the diaphragm or wall of the magnet case in which the driven magnet is housed, between the driving magnets (in other words, these three magnets are arranged in parallel with one another with the driven magnet in the magnet case being held between the driving magnets); the driving magnets are connected to each other by means of a joint plate; and one or more of such arrangments of the driven and driving magnets, the magnet case and the joint plate may be used as required, thus providing a powerful magnetically driven rotary pump.

The disc-shaped driven magnet preferably herein used is intended to mean one prepared by magnetizing a suitable disc-shaped magnetic material or one prepared by burying magnet pieces on the surface or periphery of a suitable disc-shaped material. The annular driving magnet preferably herein used may be defined approximately as above.

As mentioned above, the pump of this invention may be manufactured so that, depending on the power desired, each of a desired number of the disc-shaped driven magnets respectively housed in the magnet cases is sandwiched in between the annular driving magnets in the resulting pump.

This invention will be explained in more detail by reference to FIGS. 2 to 4.

Figure 2:
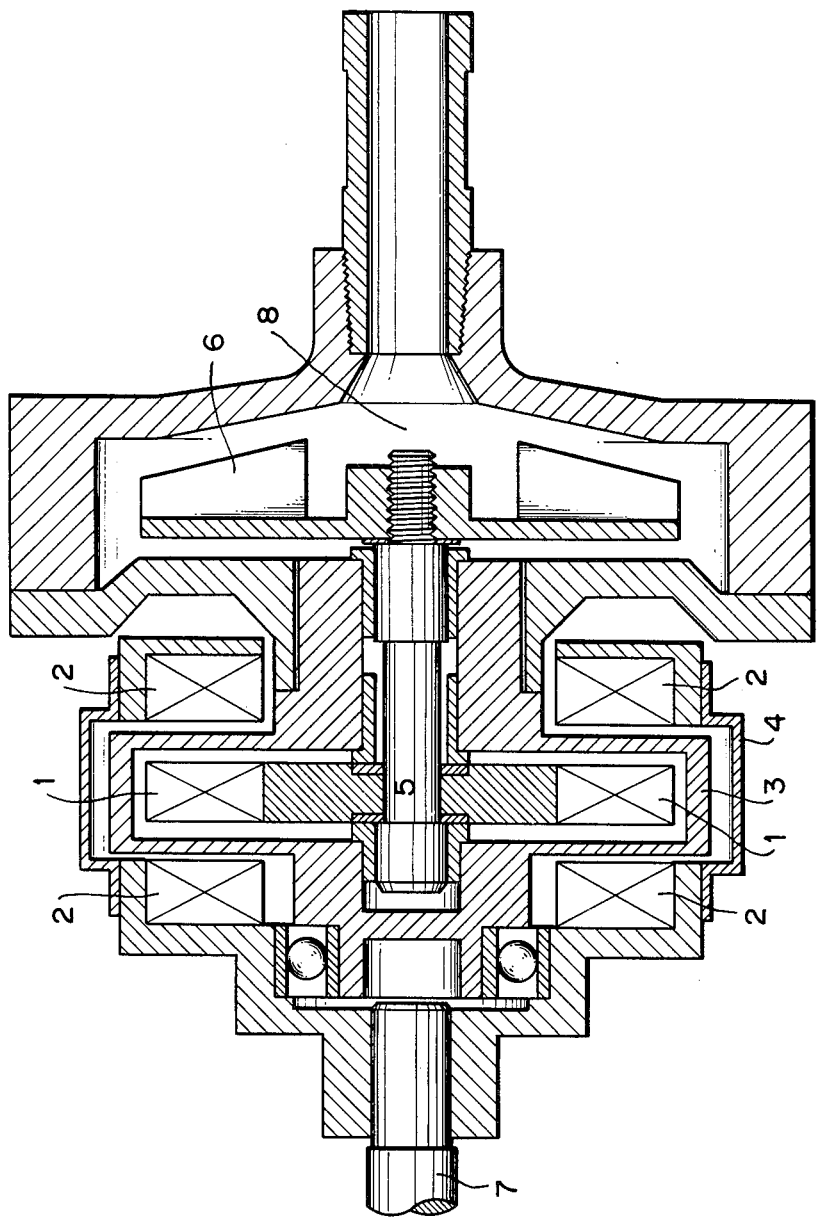
FIG. 2 is a longitudinally sectional view of an embodiment of magnetically driven rotary pump of this invention.

Referring now to FIG. 2, a disc-shaped driven magnet 1 treated to be corrosion resistant is housed in a magnet case 3 to separate in a liquid-type manner the magnet 1 from a pump chamber 8 or it may be housed in the magnet case 3 without need of being prevented from contacting with a chemical solution being pumped if the driven magnet 1 has been treated to be made corrosion resistant and the case 3 is made of a corrosion resistant material or has been treated to be made corrosion resistant. The driven magnet 1 in the magnet case 3 is sandwiched in between annular driving magnets 2 supported by a bearing secured to the wall of the case 3 and the driving magnets 2 are joined to each other at their peripheries by means of a joint plate 4, thereby to permit the most efficient use of the magnet surface areas capable of producing magnetic attraction thus obtaining a powerful driving torque to be transmitted to a pump impeller 6. In addition, such thrust as heretofore caused in the axial direction of the conventional magnetic pumps due to the magnetic attraction of magnets therein is substantially avoided in the bearing which supports the driven magnet 1 housed in the magnet case 3.

Figure 3:
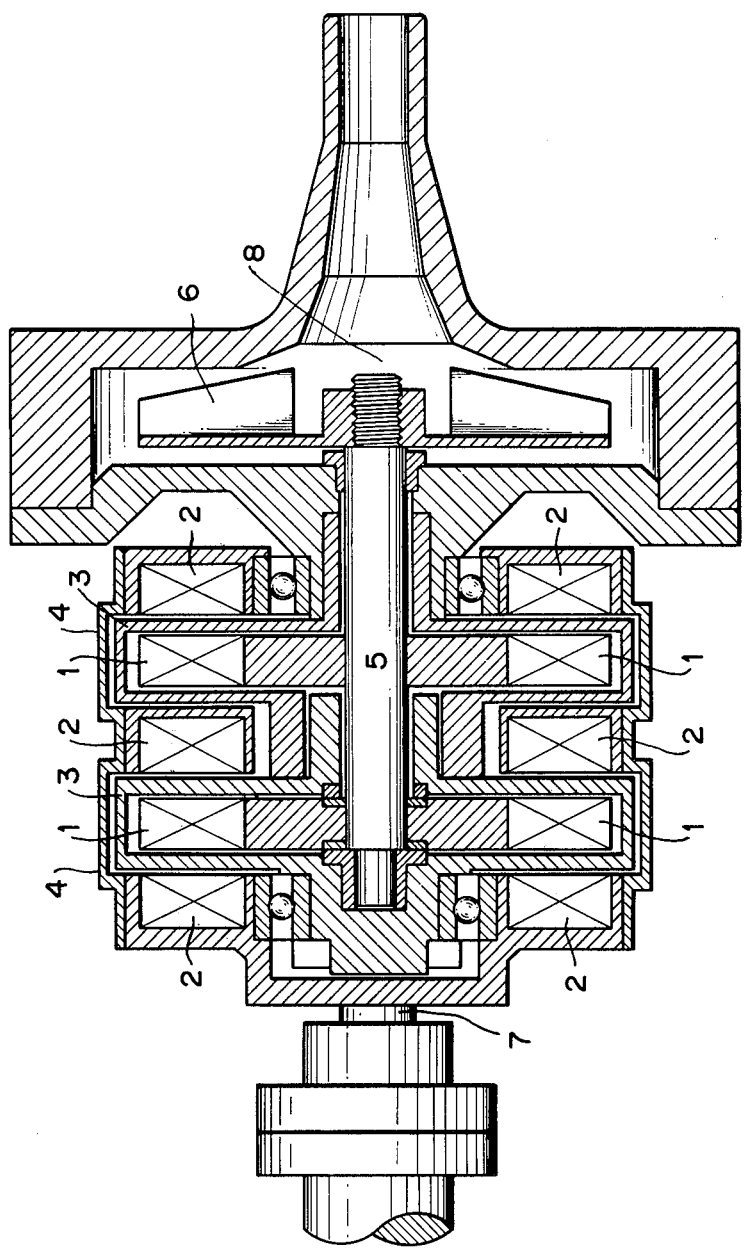
FIG. 3 is a longitudinally sectional view of another embodiment of magnetically driven rotary pump of this invention.

As suggested in FIG. 3, two or more driven magnets 1 respectively housed in the magnet cases 3 may be arranged along, and secured to, the rotary shaft 5 of the pump with each magnet 1 so housed being sandwiched in between the driving magnets 2, which are secured to the drive shaft 7 of the motor (not shown) so that they do not contact with the pump body and a corrosive solution being pumped.

When the annular driving magnets 2 are caused to rotate by the motor using a joint such as a universal joint, they in turn cause the disc-shaped driven magnets 1 each housed in the magnet case 3 to rotate synchronously therewith by means of magnetic attraction. Since the driven magnets 1 are secured to the pump rotary shaft 5 to one end of which the pump impeller 6 is secured as shown in FIG. 3, the impeller 6 is of course caused to rotate with the driven magnets 1.

In one aspect of this invention, the driving torque-transmitting mechanism consists essentially of at least one driven magnet housed in the magnet case and secured to the rotary shaft of the pump and at least two driving magnets secured to the motor drive shaft and connected to each other by means of the joint plate, with each driven magnet in the magnet case being sandwiched in between the driving magnets, whereby the torque-transmitting mechanism is separated in a liquid-tight manner from and is independent of the pump chamber thus avoiding the corrosion thereof with a chemical solution being pumped. In another aspect of this invention, the driving torque-transmitting mechanism may be differentiated from that in said one aspect of this invention only in the respect that the magnet case is made of a corrosion resistant material or has been treated to obtain corrosion resistance thereon and the at least one driven magnet has been treated to be made corrosion resistant, thus permitting the torque-transmitting mechanism to be separated from the pump chamber without necessity to form a liquid-tight seal therebetween. In the latter case, because of being corrosion resistant the magnet case and at least one driven magnet will not be corroded even if a corrosive solution enters into the magnet case by leakage from the pump chamber. Thus, the pumps of this invention have longer life.

Figure 4:
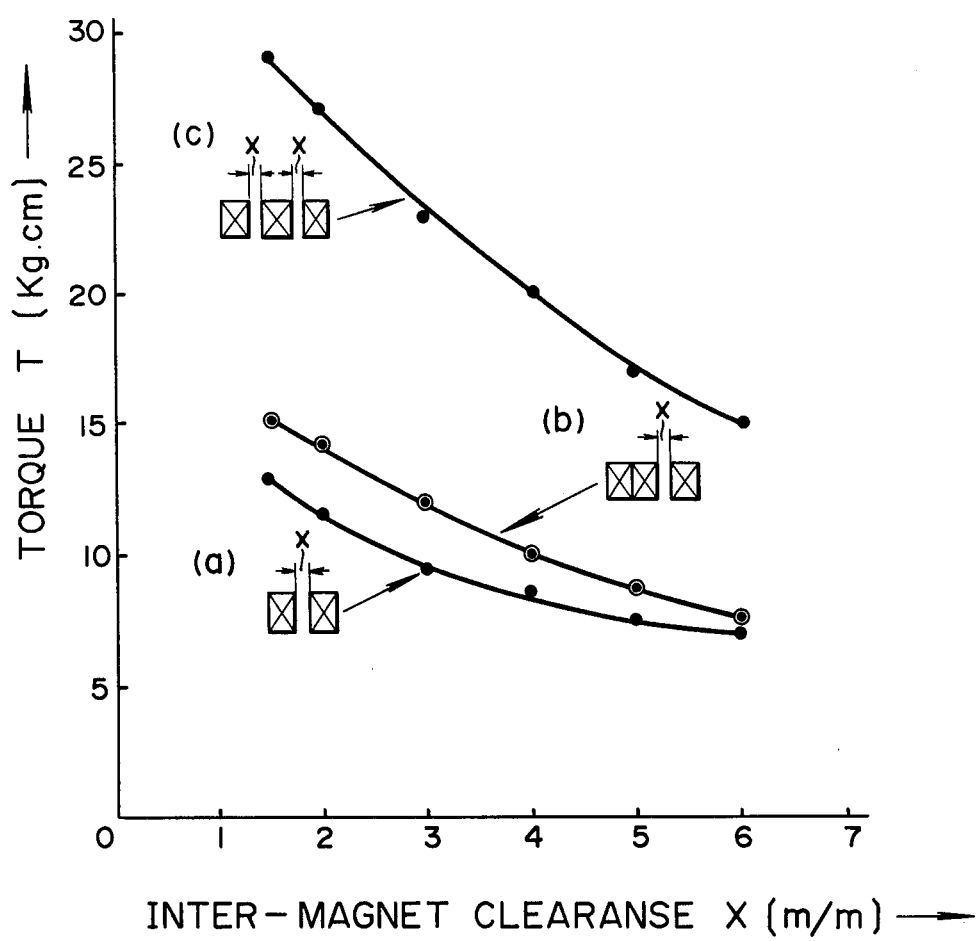
FIG. 4 shows graphically relations between a combination of magnets and a torque obtained thereby or relations between an inter-magnet clearance and a torque obtained by the magnets.

As previously stated, the driving torque-transmitting mechanism according to this invention consists essentially of one or more driven magnets each housed in the magnet case and at least two driving magnets with each of the magnet case-housed driven magnets being held between the driving magnets, thus permitting the most effective use of magnetic attraction-producible surface areas of the driving and driven magnets to be made and consequently permitting the greatest magnetic attraction or driving torque to be obtained; this is apparent from FIG. 4 showing the relation between a combination of driven and driving magnets, and the driving torque obtained thereby.

In FIG. 4, graph (A) shows the relationship between a driving torque-transmitting mechanism (hereinafter sometimes referred to as "torque mechanism" for brevity) containing a driven magnet 1 and a driving magnet 2 at a certain interval, and the driving torque obtained thereby; graph (B) the relationship between a torque mechanism containing a driven magnet 1 and two driving magnets 2 at a certain interval in that order, and the driving torque obtained thereby; and graph (C) the relationship between a torque mechanism containing a driven magnet 1 and two driving magnets 2 between which the driven magnet 1 is sandwiched at a certain interval, and the driving torque obtained thereby. In other words, FIG. 4 shows the relation between the number, manner of arrangement and inter-magnet clearance of driven and driving magnets used, and the driving torque obtained thereby.

From the comparison of these graphs with each other, it is seen that the graph (C) generally represents driving torques more than twice those represented by the graph (A) and that the graph (B) generally represents much lower driving torques than those represented by the graph (C) due to a difference in manner of arrangement of the magnets used although the magnets used for the graph (B) and those used for the graph (C) are identical in kind and number. These graphs (B) and (C) indicate that the torques obtained greatly vary depending on the manner of arrangement of the magnets used.

According to this invention, the driving torque-transmitting mechanism (that is, the torque mechanism) as shown in FIG. 2 may be manufactured as a unit assembly, and the torque mechanism as shown in FIG. 3 may be manufactured as a two-unit assembly; in this manner, a three-unit or more-unit assembly may be manufactured in order to meet driving torques required.

The driven magnet or magnets herein used may be made corrosion resistant by being coated with a synthetic resin such as an ABS (acrylonitrile-butadiene-styrene) terpolymer or polypropylene or covered with a suitable non-magnetic stainless steel sheet having an 0.5 mm for example. The magnet case or cases herein used may be made of a non-magnetic material such as a synthetic resin or suitable non-magnetic stainless steel, or may be coated or covered as mentioned above. Such corrosion resistance measures may vary depending on the properties of a solution to be pumped.

What is claimed is:

1. In a magnetically driven rotary pump driven from a power source comprising a casing, a rotary shaft rotatably mounted in said casing, a pump impeller mounted on said rotary shaft, a pump chamber means disposed about said pump impeller and in which said pump impeller operates, said pump chamber means being axially juxtaposed at one longitudinal end of said casing, at least one driven permanent magnet secured to said shaft, said driven magnet being in the form of a disc and being housed in said casing, driven means comprising at least two driving permanent magnets secured to a drive shaft which is driven by said power source, said driven means being rotatably mounted independently of the rotatable mounting of said rotary shaft, said drive shaft having its axis concentrically disposed relative to the axis of said rotary shaft and being axially juxtaposed at the side of said casing opposite to the side of the casing at which the pump housing means is axially juxtaposed, said at least two driving magnets being located outside of said casing with each driving magnet having a generally disc-like configuration having a central opening such that the latter encircles portions of said casing, said at least two driving magnets being axially spaced from one another and being located on opposite sides of said at least one driven magnet such that the latter is sandwiched between said at least two driving magnets, said at least two driving magnets being separated from said at least one driven magnet by said casing, said at least two driving magnets having outer peripheries which are connected by a joint plate disposed radially outwardly of said casing, whereby said at least one driven magnet is caused to be rotated by said at least two driving magnets by virtue of the magnetic attraction between said at least two driving magnets and said at least one driven magnet, said disposition of said at least two driving magnets on opposite sides of said at least one driven magnet resulting in substantially eliminating axial thrust of said rotary pump.

2. In a magnetically driven pump according to claim 1 wherein there are at least two driven permanent magnets secured to said rotary shaft, said at least two driven permanent magnets being axially spaced from one another, and there are at least three driving permanent magnets secured to said drive shaft in axially spaced array and arranged such that said at least two driven permanent magnets are alternately disposed and sandwiched between said at least three driving permanent magnets.

3. In a magnetically driven pump according to claim 2 wherein said at least three driving magnets have their outer peripheries connected by said joint plate disposed radially outwardly of said casing.

4. In a magnetically driven pump according to claim 1 comprising bearing means rotatably supporting said driven means on said casing.

5. In a magnetically driven pump according to claim 1 wherein there are at least two axially spaced bearing means supporting said driven means on said casing.

6. In a magnetically driven pump according to claim 1 wherein means are provided to effect a liquid-tight seal between said casing and said pump chamber.

7. In a magnetically driven pump according to claim 1 wherein said at least one driven magnet and said casing are corrosion resistant, thereby obviating a liquid-tight seal between said pump chamber and said casing.

* * * * *